(12) United States Patent
Engel

(10) Patent No.: US 8,029,178 B2
(45) Date of Patent: Oct. 4, 2011

(54) FIBER OPTIC TAIL LIGHT SYSTEM

(76) Inventor: Richard C. Engel, Ridge, NY (US)

( * ) Notice: Subject to any disclaimer, the term of this patent is extended or adjusted under 35 U.S.C. 154(b) by 310 days.

(21) Appl. No.: 12/261,001

(22) Filed: Oct. 29, 2008

(65) Prior Publication Data

US 2009/0207627 A1 Aug. 20, 2009

Related U.S. Application Data

(60) Provisional application No. 60/983,308, filed on Oct. 29, 2007.

(51) Int. Cl.
*H01L 33/00* (2010.01)
*G02B 6/00* (2006.01)
*B60Q 1/26* (2006.01)

(52) U.S. Cl. ........ 362/555; 362/487; 362/581; 362/511; 362/485; 362/541

(58) Field of Classification Search .................. 362/485, 362/487, 511, 541, 555, 581
See application file for complete search history.

(56) References Cited

U.S. PATENT DOCUMENTS

| | | | | | |
|---|---|---|---|---|---|
| 4,005,313 | A | * | 1/1977 | Tibbits | 307/10.1 |
| 5,381,501 | A | * | 1/1995 | Cardinal et al. | 385/54 |
| 5,719,552 | A | * | 2/1998 | Thompson | 340/431 |

* cited by examiner

*Primary Examiner* — Stephen F Husar
*Assistant Examiner* — James W Cranson
(74) *Attorney, Agent, or Firm* — Lillie Law, LLC; James J. Lillie

(57) ABSTRACT

A fighting system comprising: a light harness; and a fiber optic light pipe having a body with an outer diameter, and a jacket that substantially covers the entire length thereof between a proximal and distal end about the outer diameter; where said proximal end is cooperatively connected to said light harness; said second end is cooperatively connected to a diverging lens yielding an output of light.

16 Claims, 9 Drawing Sheets ary application is related and claims priority to provisional application(s) having Ser. No. 60/983,308 filed 29 Oct. 2007.

BACKGROUND OF THE INVENTION

This invention relates to a lighting system, which is used in transportation, in particular, a lighting system which is used on a secondary vehicle which utilizes the primary vehicle's electrical light signal and/or light engine.

Historically, trailers for watercraft are backed into the body of water via a ramp thereby enabling the users thereof to launch the water craft, as well as when retrieving the water craft. In both cases, a substantial portion of the trailer is submerged, usually the lighting on the tail end of the trailer are as well. Moreover, there have been ongoing efforts to improve the integrity of the seal between the lens and the bulb so as to minimize, if not eliminate, a hot bulb from coming into contact with water much cooler in temperature than the bulb. First, to prevent the bulb from exploding, second so as to prevent corrosion, wherein the problem is exacerbated when the water happens to be salt water. Ultimately, the government sets minimum standards for lighting emissions and location based primarily on the safety of the drivers, passengers, and third parties that drive on the public's roads e.g., see 49 CFR §571.108. As such, the integrity of the system is key, in that performance of tail lights, and the other associated driving lights should be at the utmost level of reliability to ensure safety of all those on the road. Moreover, given the fact that these lights are required, and that they are exposed to the elements as set forth above, in addition to the elements when on land in general, it is key to provide a system and device that improves the standard of reliability of performance of such lighting systems, and hence improves or at least maintains the safety on the roads for all those who use them.

SUMMARY OF THE INVENTION

The present invention is directed to a lighting system having the primary advantage of improving the reliability of performance. In order to accomplish the foregoing advantage, in a first embodiment illustrated in FIG. 4, a lighting system includes a light harness; a fiber optic light pipe having a body with an outer diameter, and a jacket that substantially covers the entire length thereof between a proximal and distal end about the outer diameter; where said proximal end is cooperatively connected to said light harness; said second end is cooperatively connected to a diverging lens yielding an output of light.

In a second embodiment illustrated in FIG. 5, a lighting system for use with a secondary vehicle having an electrical to optical adapter comprising a light harness; a fiber optic light pipe having a body with an outer diameter, and a jacket that substantially covers the entire length thereof between a proximal and distal end about the outer diameter; where said proximal end is cooperatively connected to said light harness; said second end is cooperatively connected to a diverging lens yielding an output of light.

In a third embodiment illustrated in FIG. 6, a lighting system for the secondary vehicle includes a light harness; a fiber optic light pipe having a body with an outer diameter, and a jacket that substantially covers the entire length thereof between a proximal and distal end about the outer diameter; where said proximal end is cooperatively connected to said light harness; said second end is cooperatively connected to a diverging lens yielding an output of light. It is envisioned that vehicle manufacturers could incorporate an optical tap into the design of vehicle taillights to allow direct utilization of the primary vehicle's light engine. This embodiment further increases reliability as the duplication of light engines is reduced if not eliminated as well as reducing if not eliminating the quantity of electrical connections.

In another embodiment, the lighting system includes a light engine; and a fiber optic light pipe having a body with an outer diameter, and a jacket that substantially covers the entire length thereof between a proximal and distal end about the outer diameter; where said proximal end is cooperatively connected to said light engine; said second end is cooperatively connected to a diverging lens yielding an output of light.

It is envisioned that in all scenarios that a plurality of lenses maybe incorporated anywhere along the body, wherein there may be a plurality of chairs stemming from a single light harness, for example, left and right side of a vehicle, and/or a spoke and hub fashion wherein the source is fed into a hub, wherefrom various spokes extend radially outwardly therefrom carrying the light energy to desired locations.

Other objectives, advantages, and novel features of the present invention will become more apparent from the following detailed description when taken in conjunction with the accompanying drawings.

BRIEF DESCRIPTION OF THE DRAWINGS

The following drawings, in which like reference characters indicate like parts, are provided for illustration of the invention and are not intended to limit the invention in any manner whatsoever.

DETAILED DESCRIPTION OF THE INVENTION

The following descriptions of the preferred embodiments are presented to illustrate the present invention and are not to be construed to limit the claims in any manner whatsoever.

In reference to the drawings, namely FIGS. 1 to 6A, FIG. 1 illustrates the classical four (4) wire electric lighting system on a secondary vehicle (trailer). This system has an electrical wiring interface with the primary vehicle (not shown) where the electrical connection is located. Moreover, the left and right side have various marker lights, and the tail end also having marker lights along with tail lights, directional, and license plate lights.

Figure 2:
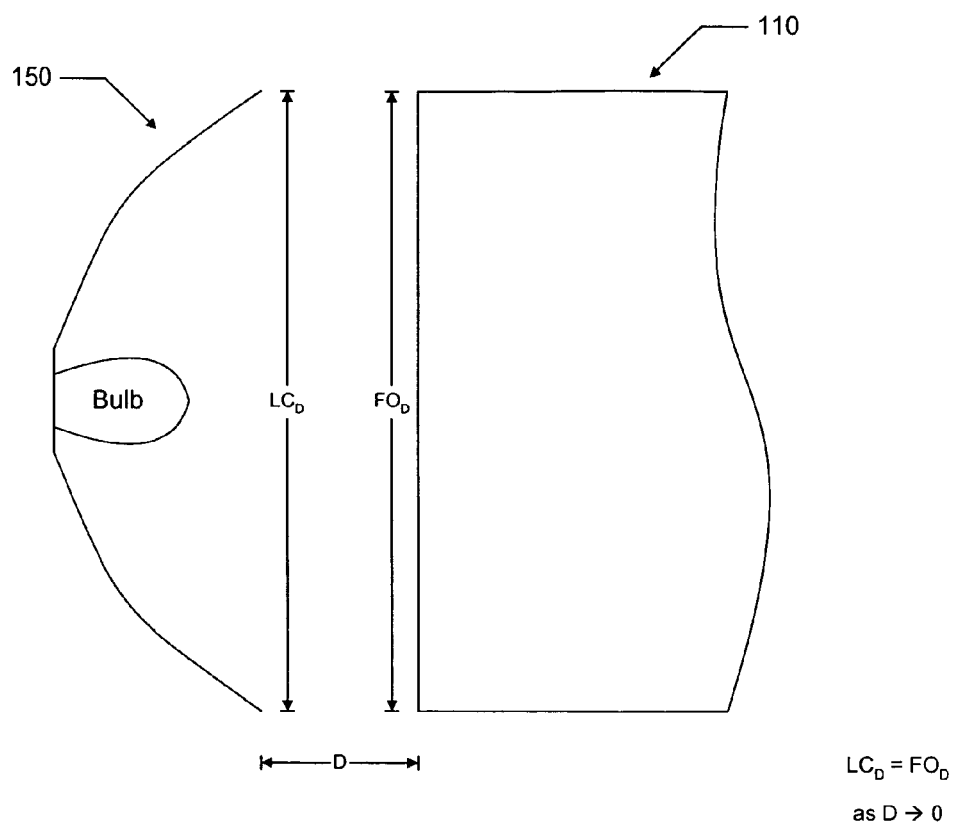
FIG. 2 illustrates a light engine and light harness.
Figure 3:
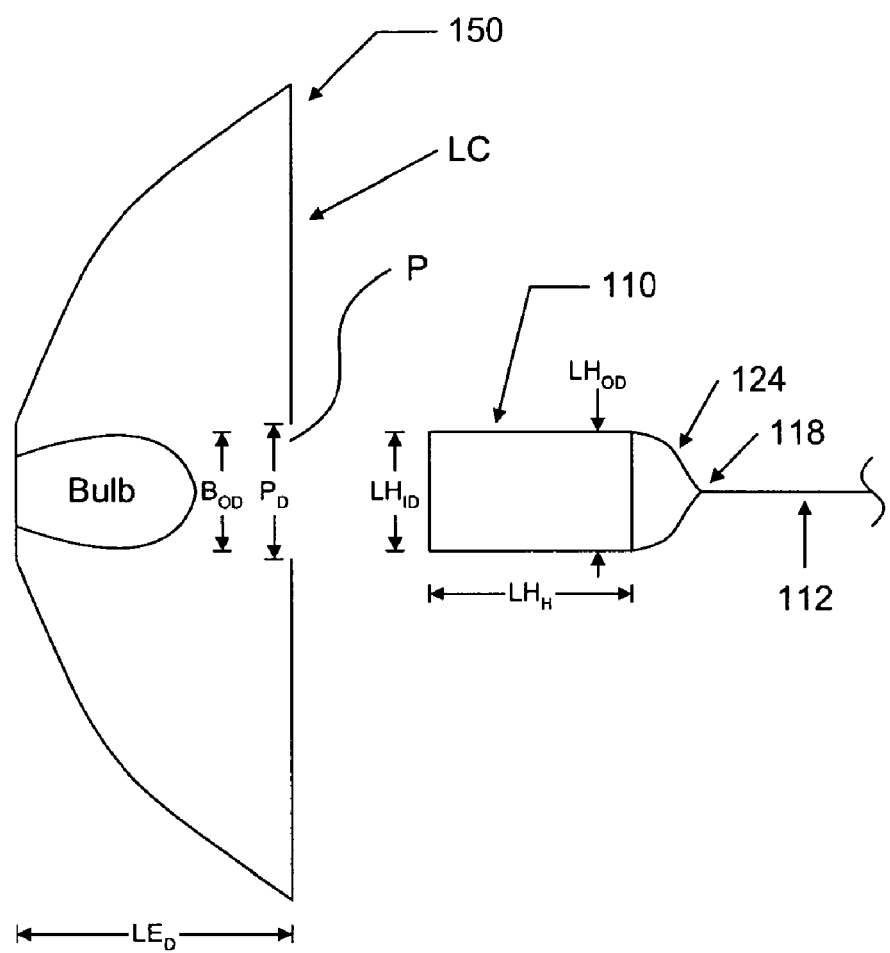
FIG. 3 illustrates a light engine and alternative light harness.

FIGS. 2, and 3 illustrate two methods of harnessing the optical energy, wherein the present invention, which is directed to a lighting system 100, having a light harness 110 configured and dimensioned to interface with a light engine 150 on the primary vehicle. FIG. 2 illustrates the FO as the light harness 110 which abuts the engine 150, and FIG. 3 the harness 110 substantially encompasses the engine 150. A light engine 150 may include any one or more of the following, alone or in combination, a LED, a conventional bulb, a halogen bulb, a xeon bulb or other various bulb types commonly known in the industry, however, if a LED is used, the light engine 150 would include preferably a current limiting resistor as a conventional bulb does not require such resistor. It is envisioned that the light engine 150 may be on either the primary (e.g., the towing vehicle), or the secondary vehicle (e.g., a trailer) or both if multiple sources are desired.

Typically, a primary vehicle's rear light assembly contains a diverging lens, one or more bulbs on each side of the vehicle, and a lens cover. It is preferred that a bulb selected as a light engine is not of the dual element type, as the optical harnessing of the dual element functions will not be parseable. The functions of the rear lights on the primary vehicle include (i) stop (e.g., brake lights) (ii) turn (e.g., directionals), and (iii) tail lights (e.g., including license plate, running lights, and marker lights). Functionally, type (i) and (iii) need not be distinguished between left and right, much unlike type (ii) the directionals. As such, the preferred combination would be a bulb having the functions of stop & turn, having one on the left and one on the right side of the vehicle, and then a tail light on either the left or right (with no preference therebetween), hence a three bulb source or light engine to be optically harnessed.

Figure 2A:
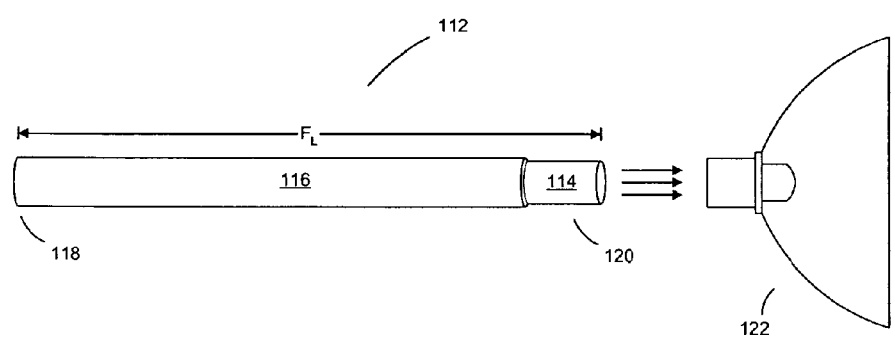
FIG. 2A illustrates a light pipe into a diverging lense.

FIG. 2A illustrates the lighting system 100 which further comprises a fiber optic light pipe 112 having a body 114 with an outer diameter $F_{OD}$, and a jacket 116 that substantially covers the entire length $F_L$ thereof between a proximal 118 and distal 120 end about the outer diameter $F_{OD}$; where said proximal end 118 is cooperatively connected to said light harness 110; said distal end 120 is cooperatively connected to a diverging lens 122 yielding an output of light.

The light harness 110 illustrated in FIG. 3 optically captures the energy from a light engine 150. The harness 110 includes a jacket and/or a converging lens 124 cooperatively connected to said proximal end 118. The outer diameter $F_{OD}$ has an upper limit of less than about one (1) inch, wherein the proximal end 118 is cooperatively connected to said light engine 150 via a converging lens 124 or the jacket 116 wherein the output of light emanating from distal end 120 at least meets or exceeds the Department of Transportation standards. For example, a common parking, stop, tail and turn light conventional bulb, namely, the 1157 series manufactured by Sylvania® ranges from about 19 to about 40 lumens for parking, and ranges from about 275 to about 500 lumens for signaling. The efficiency of the system 100 is unknown at this time, however, it is understood that the emitting light at the final destination, i.e, tail light will be the same amount of lumens that a typical 1157 series light emits, or at least meets or exceeds the DOT standard.

The harness 110 further includes a cylindrical portion having a height $LH_H$ that is greater than the depth of the diverging lens $LE_D$ of the light engine 150 having an inside diameter $LH_{ID}$, or more simply $LH_H > LE_D$; moreover, wherein the inside diameter $LH_{ID}$ is greater than the outside diameter of the bulb $B_{OD}$, or more simply $LH_{ID} > B_{OD}$ thereby permitting the harness 110 to substantially encompass the bulb thereby maximizing capture of the bulb's energy without touching the bulb and compromising the integrity of thereof, as $LH_{OD} > LH_{ID}$. Such maximization may be further achieved via reflective coating about the surface of the converging lens.

In practice, a porthole P would need to exist in the lens cover LC of the primary vehicle, sufficiently sized to permit egress of the harness 110 as set forth above. More particularly, the diameter of the porthole $P_D$ would need to be greater than the outside diameter of the harness 110 $LH_{OD}$ or mathematically, $P_D > LH_{OD}$. It Is envisioned (not shown) that the porthole P maybe plugged when not in use, either via a entirely separable plug (not shown), e.g., removably affixed via threads, or via a plug having a hinged or tethered connection to the lens so as not to misplace the plug when the harness 110 is to occupy the porthole P. If hingedly connected, possibly with a tension spring so as to automatically close the porthole P when the harness 110 is not in residence. It would seem preferable to have a plug made of a non-opaque material so as to permit light to pass therethrough, and to have some rubber like weather stripping in-between the porthole and the plug, and even more preferably, of the same material as the lens of the primary vehicle, including color etc.

Furthermore, a light harness 110 would be needed for each light engine 150, and a corresponding porthole P for each, thus a total of three portholes (not shown) one for each of the left and right stop and turn light engine harnesses, and one for the tail light engine harness, each not inconsistent with the description set forth hereinabove.

Figure 1:
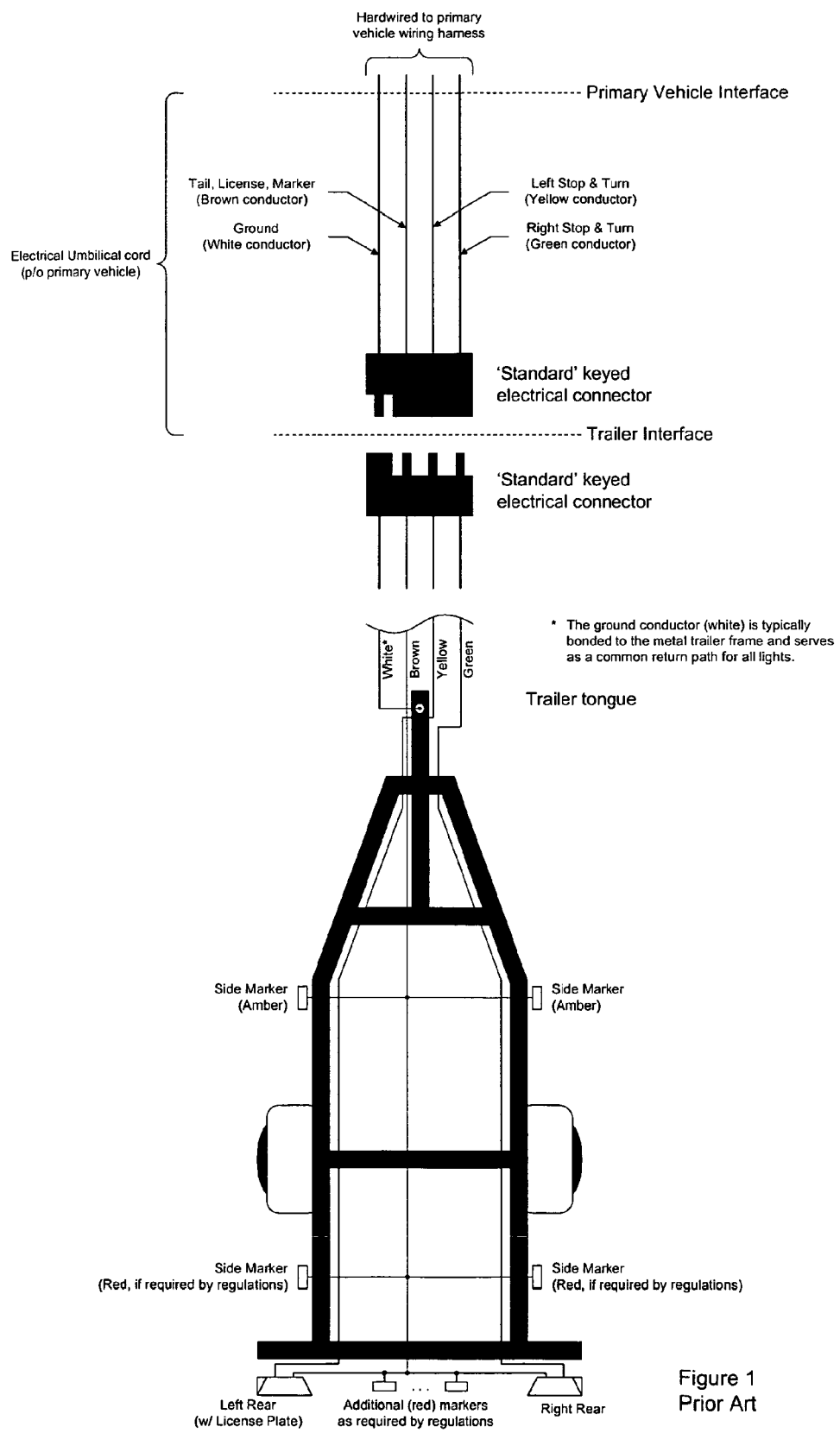
FIG. 1 illustrates a schematic of the prior art having a typical four (4) wire system.
Figure 4:
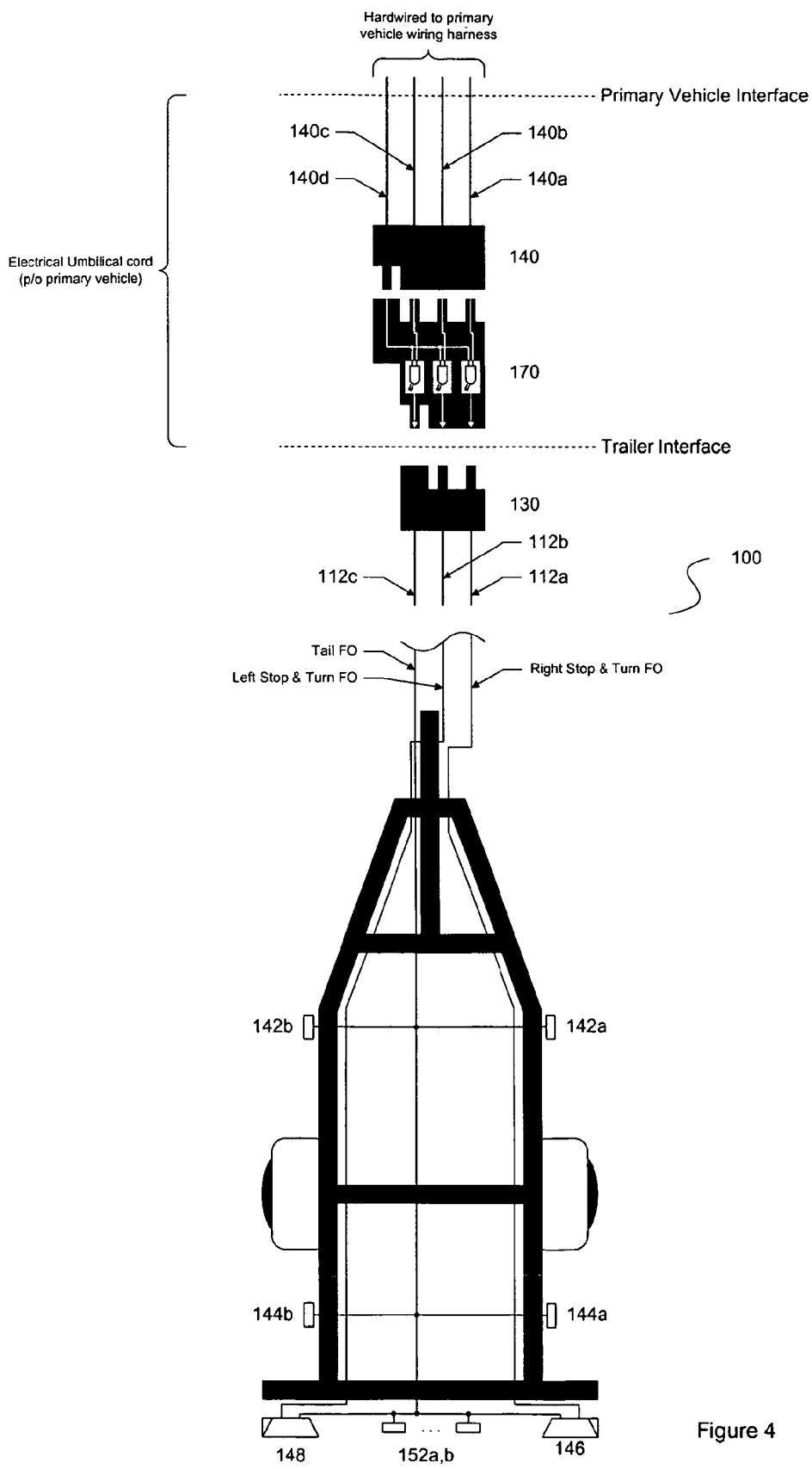
FIG. 4 illustrates a schematic of the preferred embodiment having a three (3) light pipe system interfaced with a typical four (4) wire system using an electrical-to-optical adapter.

FIG. 4 illustrates the trailer of FIG. 1 having three fiber optical light pipes 112a,b,c in lieu of the four copper wires 140a,b,c,d. The schematic includes an optical connector 130 which collects the optical signal, preferably having an orientation key feature, wherein light pipes 112a,b,c emanate to their respective destinations: (i) 146 red stop/directional lights—right; (ii) 148 red stop/directional lights—left; and (iii) 142a amber side marker light(s)—right, 142b amber side marker light(s)—left, 144a red side marker light(s)—right, 144b red side marker light(s)—left, 146 red tail light—right, 148 red tail light—w/white license plate light—left, 152a,b red rear marker lights as illustrated in FIG. 4, or lighting as required by the DOT as defined by Federal, State or local regulation having proper jurisdiction.

The connector 130 mates to an electric to optical adapter (aka E2OA) 170 which comprises a light engine 150 and a light harness 110 cooperatively connected together, wherein the E2OA 170 is located towards the front of the secondary vehicle (tongue of the trailer), and has a plurality of light engines 150a,b,c and light harnesses 110a,b,c working together to transform the typical four (4) wire electrical interface into a three (3) light pipe output, which is mateable with connector 130 having light pipes 112a,b,c so as to speedily connect/disconnect the primary and second vehicles lighting systems.

Specifically, pipe 112a extends to the aft portion of the trailer to illuminate the right stop and turn lights 146, and may optionally be tapped into therebetween. Pipe 112b, extends to the aft of the trailer to illuminate the left stop and turn lights 148, and may optionally be tapped into therebetween, and pipe 112c the same but for the tail 146, 148, and marker Lights 142a,b, 144a,b, and 152a,b.

Figure 5:
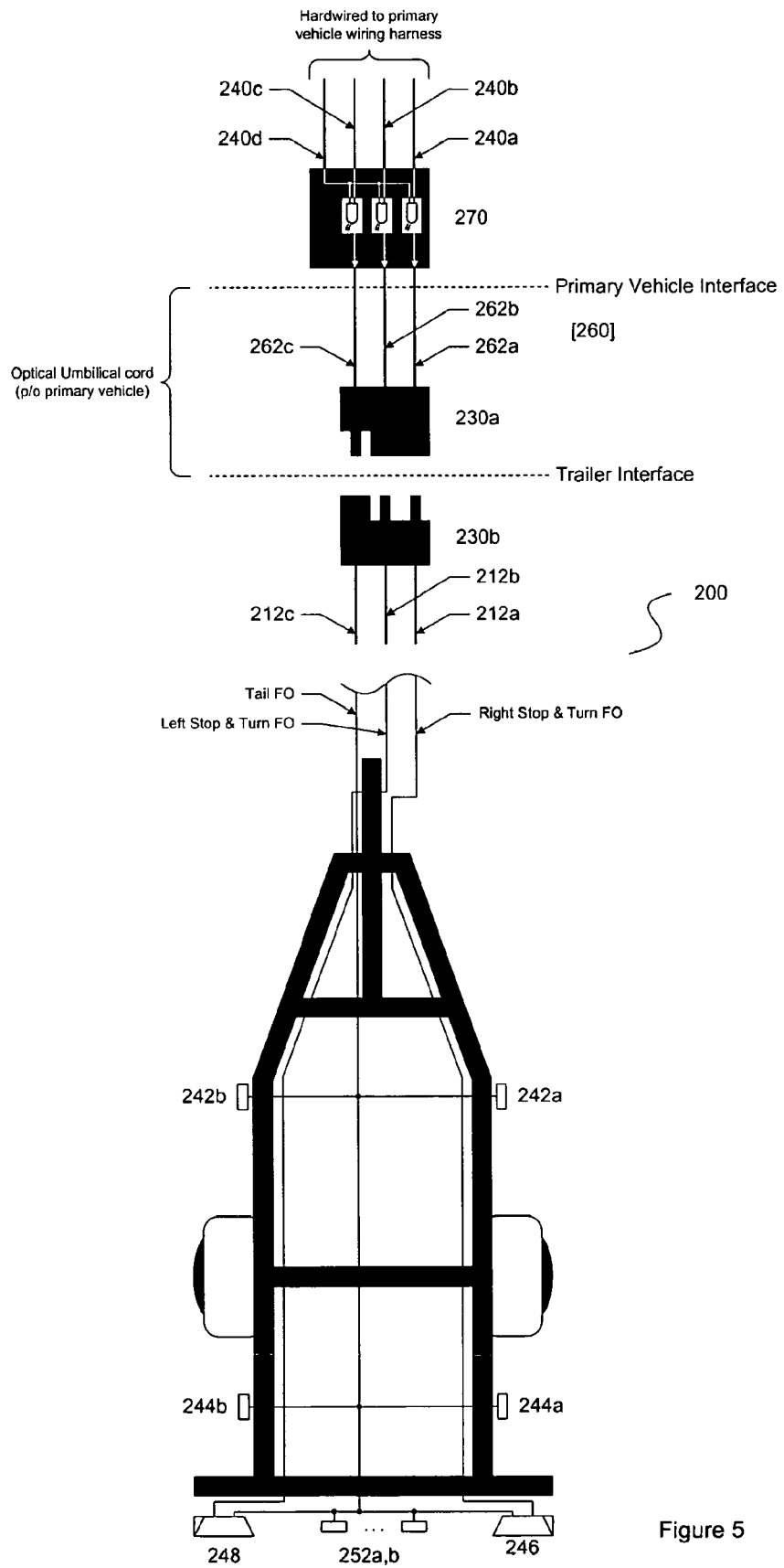
FIG. 5 illustrates a schematic of the preferred embodiment having a three (3) light pipe system interfaced using an optical interconnect to an electrical-to-optical adapter located on the primary vehicle.

A second preferred embodiment illustrated in FIG. 5, includes an electric to optical adaptor (aka E2OA) 270 which comprises a light engine 250 and a light harness 210 cooperatively connected together, wherein the E2OA 270 is located on the primary vehicle, and has a plurality of light engines 250a,b,c and light harnesses 210a,b,c working together to transform the typical four (4) wire electrical interface into a three (3) light pipe output, which is capable of receiving a connector 230 having light pipes 212a,b,c so as to speedily connect/disconnect the primary and second vehicles lighting systems.

The E2OA 270 positioned on the primary vehicle is connected to a fiber optic interconnect harness 260 providing means for connecting the primary to the secondary vehicle; wherein the harness 260 functions as an optical extension cord, having pipes 262a,b,c each having a first and second ends, wherein the first ends are mateable with 240a,b,c via E2OA 270 and said seconds ends terminating in optical connector 230a.

Figure 5A:
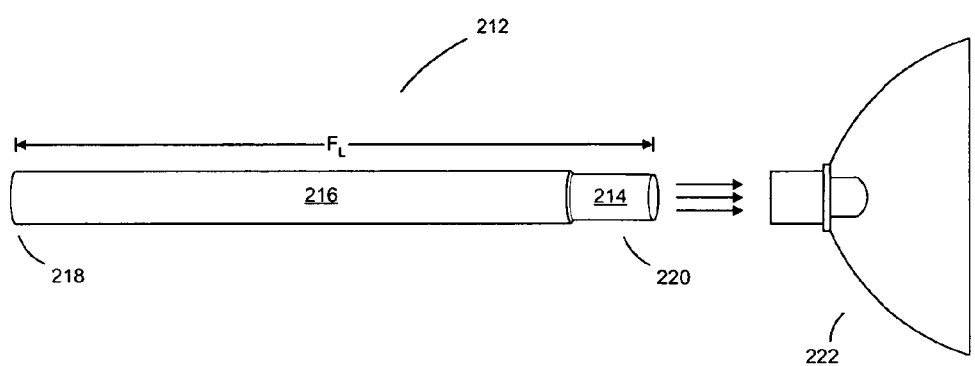
FIG. 5A illustrates a light pipe into a diverging lense.

Connector 230b is connected thereto 230a and has fiber optic light pipes 212a,b,c each having a body 214 with an outer diameter $F_{OD}$, and a jacket 216 that substantially covers the entire length $F_L$ thereof between a proximal and distal end 218,220 about the outer diameter $F_{OD}$; where each proximal end 218 emanates from the optical connector 230b, wherein each second end is cooperatively connected to a diverging lens yielding an output of light. See FIG. 5A.

Particularly, optical connector 230b collects the optical signal from connector 230a, preferably having an orientation key feature, wherein light pipes 212a,b,c emanate to their respective destinations: (i) 246 red stop/directional lights—right; (ii) 248 red stop/directional lights—left; and (iii) 242a amber side marker light(s)—right, 242b amber side marker light(s)—left, 244a red side marker light(s)—right, 244b red side marker light(s)—left, 246 red tail light—right, 248 red tail light—w/white license plate light—left, 252a,b red rear marker lights as illustrated in FIG. 5, or lighting as required by the DOT as defined by Federal, State or local regulation having proper jurisdiction.

Specifically, pipe 212a extends to the aft portion of the trailer to illuminate the right stop and turn lights 246, and may optionally be tapped into therebetween. Pipe 212b, extends to the aft of the trailer to illuminate the left stop and turn lights 248, and may optionally be tapped into therebetween, and pipe 212c the same but for the tail 246,248, and marker lights 242a,b, 244a,b, and 252a,b.

Figure 6:
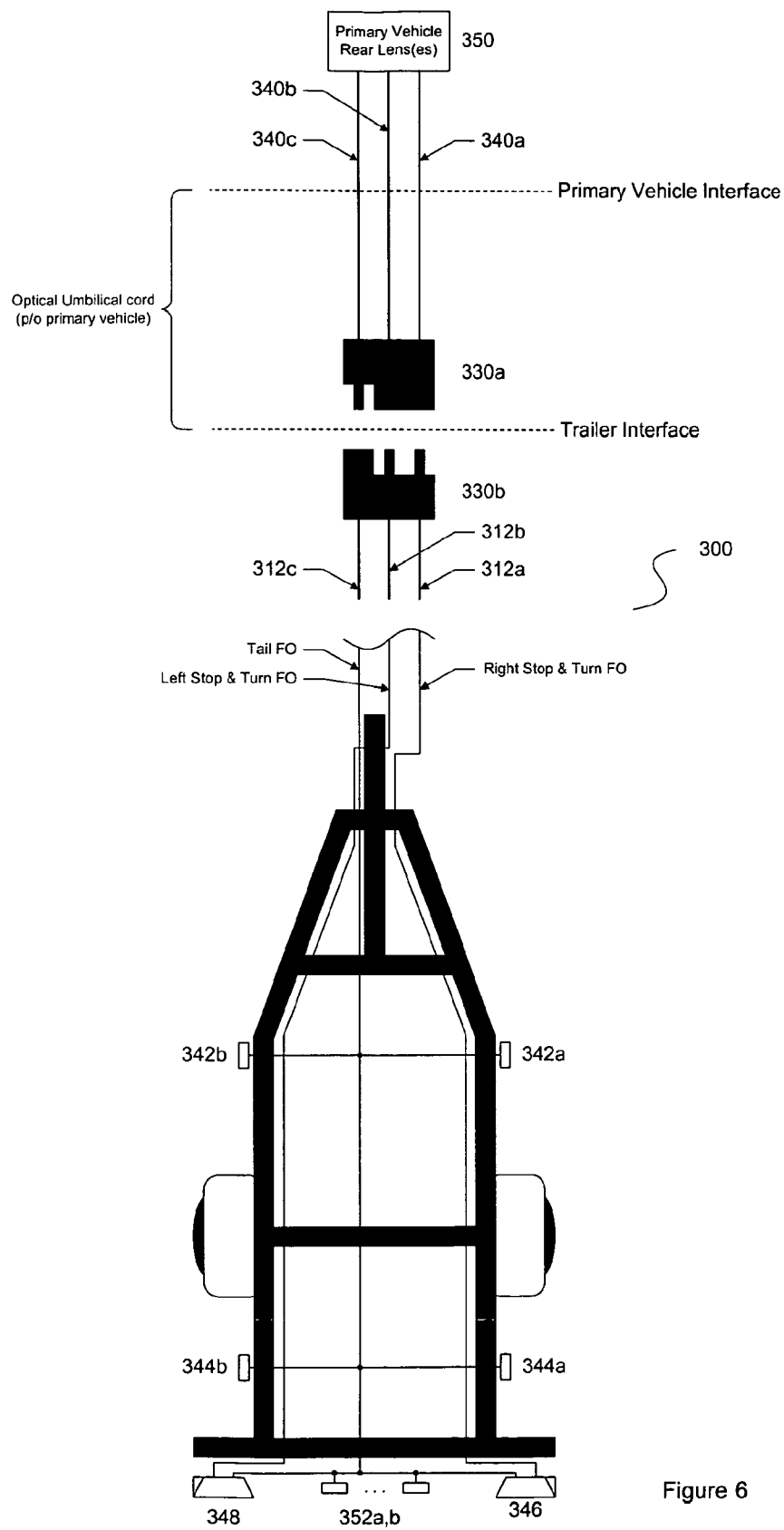
FIG. 6 illustrates a schematic of the preferred embodiment having a three (3) light pipe system interfaced using an optical interconnect to an optical interface located on the primary vehicle.
Figure 6A:
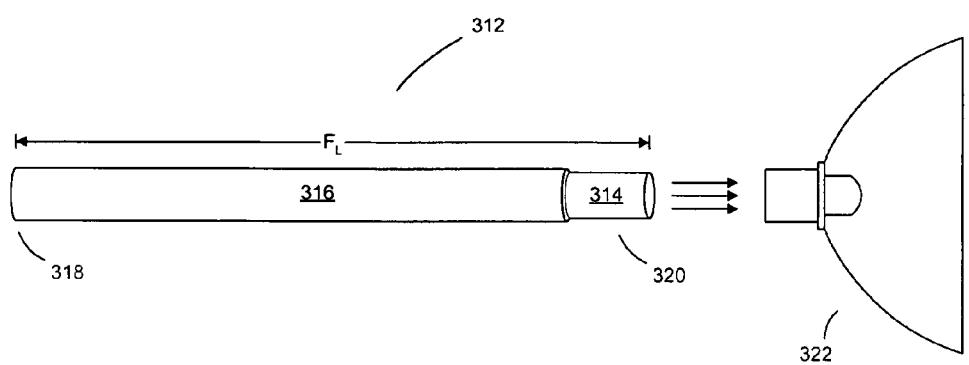
FIG. 6A illustrates a light pipe into a diverging lense.

In a third preferred embodiment illustrated in FIG. 6, an optical light engine 350 and diverging tail light lens LC of the primary vehicle interface directly with light pipes 340a,b,c having a first and second end, wherein each first end abuts the light engine 350 and each functioning as an optical light harness connecting the primary vehicle to the secondary vehicle. The second ends of pipes 340a,b,c connect to optical connector 330a which preferably has a keyed characteristic so as ensure proper orientation during connection with a second optical connector 330b on the secondary vehicle.

Connector 330b has light pipes 312a,b,c each light pipe 312 having a body 314 with an outer diameter $F_{OD}$, and a jacket 314 that substantially covers the entire length $F_L$ thereof between a proximal and distal end 318, 320 about the outer diameter $F_{OD}$; where said proximal end 318 is cooperatively connected to said connector 330b; said distal end 320 is cooperatively connected to a diverging lens yielding an output of light. See FIG. 6A.

Particularly, optical connector 330b collects the optical signal from connector 330a, preferably having an orientation key feature, wherein light pipes 312a,b,c emanate to their respective destinations: (i) 346 red stop/directional lights—right; (ii) 348 red stop/directional lights—left; and (iii) 342a amber side marker light(s)—right, 342b amber side marker light(s)—left, 344a red side marker light(s)—right, 344b red side marker light(s)—left, 346 red tail light—right, 348 red tail light—w/white license plate light—left, 352a,b red rear marker lights as illustrated in FIG. 6, or lighting as required by the DOT as defined by Federal, State or local regulation having proper jurisdiction.

Specifically, pipe 312a extends to the aft portion of the trailer to illuminate the right stop and turn lights 346, and may optionally be tapped into therebetween. Pipe 312b, extends to the aft of the trailer to illuminate the left stop and turn lights 348, and may optionally be tapped into therebetween, and pipe 312c the same but for the tail 346,348, and marker lights 342a,b, 344a,b, and 352a,b.

A light engine 150,250,350 includes any one or more of the following, alone or in combination, a LED, a conventional bulb, a halogen bulb, a xeon bulb or other various types commonly known in the industry, including a light pipe, however, if a LED is used, the light engine 150,250,350 would include current limiting resistor as a conventional bulb does not require such resistor. The body 114,214,314 having an outer diameter $F_{OD}$ of an upper limit of less than about one (1) inch. The proximal end 118,218,318 is cooperatively connected to the light engine 150,250,350 via a converging lens and/or the jacket 116,216,316 wherein the output of light at least meets or exceeds the Department of Transportation standards.

In order to assist one in the understanding of the operation of the present invention 1, it would be advantageous to consider use in practice. A plethora of embodiments will be presented that illustrate the logical progression of implementation over time.

In the first embodiment set forth herein above and illustrated in FIG. 4, three light pipes are incorporated on the secondary vehicle (e.g., trailer) in lieu of the classic four wire electrical interface, consists of the following electrical signals:

Green conductor (4 wire): right hand turn &z stop light(s)
Yellow conductor (4 wire): left hand turn & stop light(s)
Brown conductor (4 wire): tail, license, marker lights
White conductor (4 wire): ground return for above signals
which connect via a standardized keyed connector via an electrical tether to the primary vehicle. The light pipe implementation requires no ground return thus reducing the four wire count to three light pipes. In a similar fashion these light pipes consist of the following optical signals:
Light Pipe 1 (invention): right hand turn & stop indication
Light Pipe 2 (invention): left hand turn & stop indication
Light Pipe 3 (invention): tail, license, marker illumination
which should also implement some form of keying to prevent incorrect mating of the optical connectors.

The use of the optical light pipe addresses several safety issues. The issue of wire/bulb corrosion is completely eliminated. Historically, any water/dirt intrusion in the classic electrical interface most often yielded a complete failure of the electrical signal. In the first embodiment, water/dirt intrusion at the optical interface(s) or connection(s) would result in attenuated light transfer (reduced illumination intensity) but still would remain functional. In applications involving watercraft and submersion in a body of water (lake, river, bay, ocean, etc.) the issue of a hot bulb coming in contact with cooler water mentioned earlier is again completely eliminated. The optical light pipe contains no sources of heat production and as such is impervious in that respect.

The first embodiment set forth hereinabove and illustrated in FIG. 4, terminates in an optical connection at the front of the secondary vehicle (trailer tongue). Compatibility with current four wire electrical systems would be accomplished via an electrical-to-optical adapter which would be situated at the optical connection point. This embodiment significantly improves the safety and operational state of the lighting/ indicators on the secondary vehicle (trailer) while laying the ground work for improving safety/reliability even further in other embodiments.

The second embodiment of the invention set forth herein above and illustrated in FIG. 5, builds upon improving safety/reliability by fully extending the optical interface to primary (towing) vehicle. In this respect the safety/reliability benefits gained through the implementation of the first embodiment are retained while further exploiting the use of the optical connections. Wherein the first embodiment, compatibility with existing four wire systems currently in use was provided by an electrical-to-optical adapter, whereas in this second embodiment, the adapter is positioned in the protected confines of the primary (towing) vehicle rather than leaving it exposed to the elements. The optical interface is positioned at the rear of the primary (towing vehicle) and the safety/reliability benefits realized on the secondary vehicle (trailer) now apply to the tether connection between the primary and secondary vehicles.

The third embodiment of the invention set forth herein above and illustrated in FIG. 6, improves safety/reliability yet a step further over that realized by the second embodiment. In this embodiment, the electrical-to-optical adapter (E2OA) is eliminated in entirety and relies on an optical 'tap' port embedded in the design of the primary (towing) vehicle taillight. This approach allows all of the secondary vehicle indicators and illumination to be driven solely by the indicators and illumination of the primary vehicle. Vehicles may be equipped with some form of 'tail light is out' indication to alert the driver to a potential safety problem. In this embodiment, since the secondary vehicle indicators and illumination are directly dependent on the operation of the primary vehicle, any lighting issues would be easier to identify and rectify. Since the first and second embodiments rely on an electrical-to-optical adapter E2OA which may or may not be equipped with feedback indication operational readiness is not always assured.

It is envisioned that the optical light pipe approach could be applied to other multi-wire trailer implementations. Other electrical implementations exist that contain more than four wires. Other common configurations include five-, six- and seven wire electrical interfaces. Each of the interfaces share the common four wire electrical interface. These implementations add the following electrical signals:
Blue conductor [5,6,7 wire]: Electric brake control/breakaway switch
Red conductor [6,7 wire]: Break away kit/battery charger
Purple conductor [7 wire]: Back up light(s)

With respect to these configurations, the back-up light could easily be replaced by an optical light pipe:
Light Pipe 4 (invention): Back-up light(s)

The electric brake control could potentially be adapted by using a pulse width modulated optical signal, providing the secondary vehicle has a source of on-board power (i.e. battery):
Light Pipe 5 (invention): Electric brake control The battery charger power is a purely electrical signal and could not be replaced by an optical light pipe. One option with respect to the latter two signals in these multi-wire electrical interfaces would be to make use of a hybrid connector:
Electrical signal 6 (invention): Break-away/battery charger
Electrical signal 7 (invention): Ground return for electrical signal 6

The hybrid connector would contain optical pins/sockets in certain defined locations to support the optical signals and electrical pins/sockets in other designated locations to support the purely electrical signals.

All of the above referenced patents; patent applications and publications are hereby incorporated by reference. Many variations of the present invention will suggest themselves to those of ordinary skill in the art in light of the above detailed description. All such obvious modifications are within the full-intended spirit and scope of the claims of the present application.

What is claimed is:

1. A fiber optic lighting system comprising:
an electric to optical adapter comprising a light engine and light harness cooperatively connected together, an input electrical port and an output optical port, wherein said input port is configured and dimensioned to plug into a preexisting standard keyed electrical connector emanating from a primary vehicle forming the primary vehicle interface, and supplying power to the light engine, and said output optical port is configured and dimensioned to receive an input port of an optical connector forming the secondary vehicle interface;
said optical connector having an output port wherefrom a light pipe having a proximal distal end radiates outwardly from the proximal end to a desired destination on said distal end, wherein said systems provides an output of light sufficient to meet DOT standards set forth in Title 49 of the Code of Federal Regulations.

2. The light system as in claim 1, wherein said adapter comprises a plurality of light engines and light harnesses.

3. The light system as in claim 1, wherein said adapter has four electrical input ports and three optical output ports, wherein the ground wire is connected to one terminal on each light engine.

4. The light system as in claim 1, wherein a first pipe extends to the aft portion of the secondary vehicle to illuminate the right stop and turn lights, and may optionally be tapped into therebetween; a second pipe extends to the aft of the secondary vehicle to illuminate the left stop and turn lights, and may optionally be tapped into therebetween, and a third pipe the same but for the tail, and marker lights.

5. The light system as in claim 1, where said light engine includes one or more of the following alone or in combination, a LED, a conventional non-dual element type bulb, a halogen bulb, a xeon bulb or other various bulb types known in the industry, whereas if an LED as used, it is preferred that a current limiting resistor be connected thereto, a light pipe.

6. The light systems as in claim 1, wherein said harness includes a converging lens engaging said light engine.

7. A fiber optic light systems comprising:
an optical connector configured and dimension to interface with an electrical to optical adapter on a primary vehicle, and optionally a fiber optic interconnect harness therebetween;
said connector having a body with an outer diameter and jacket that substantially covers the entire length thereof between a proximal and distal end about the outer diameter; where said proximal end emanates from said connector to a desire destination on said distal end, wherein said system provides an output of light sufficient to meet DOT standards set forth in Title 49 of the Code of Federal Regulations;
said optical interconnect harness providing means for extending said optical connector from the secondary to the primary to vehicle, while having a first and second end, wherein said first end is mateable with the optical adapter, and the second end terminating in said optical connector.

8. The light system as in claim 7, wherein said connector comprises a plurality of light pipes.

9. The light system as in claim 7, wherein a first pipe extends to the aft portion of the secondary vehicle to illuminate the right stop and turn lights, and may optionally be tapped into therebetween; a second pipe extends to the aft of the secondary vehicle to illuminate the left stop and turn lights, and may optionally be tapped into therebetween, and a third pipe the same but for the tail, and marker lights.

10. The light system as in claim 7, where said light engine includes one or more of the following alone or in combination, a LED, a conventional non-dual element type bulb, a halogen bulb, a xeon bulb or other various bulb types known in the industry, whereas if an LED is used, it is preferred that a current limiting resistor be connected thereto, a light pipe.

11. The light system as in claim 7, wherein said harness includes a converging lens engaging said light engine.

12. A fiber optic light system comprising:
a first an optical connector positioned on the secondary vehicle and configured and dimensioned to interface with an second optical connector forming a secondary vehicle interface, wherein said secondary interface preferably has an orientation key feature, said second connector being configured and dimensioned to interface with a preexisting optical light engine on a primary vehicle forming a primary vehicle interface via a light pipe therebetween; said pipe having a body with an outer diameter and jacket that substantially covers the entire length thereof between a proximal and distal end about the outer diameter; where said proximal end emanates from said connector to the light engine near the distal end;

said first connector having a light pipe with a body, said body having an outer diameter and jacket that substantially covers the entire length thereof between a proximal and distal end about the outer diameter; where said proximal end emanates from said connector to a desire destination on said distal end, wherein said systems provides an output of light sufficient to meet DOT standards set forth in Title 49 of the Code of Federal Regulations.

13. The light system as in claim 12, wherein each connector comprises a plurality of light pipes.

14. The light system as in claim 12, wherein a first pipe extends to the aft portion of the secondary vehicle to illuminate the right stop and turn lights, and may optionally be tapped into therebetween; a second pipe extends to the aft of the secondary vehicle to illuminate the left stop and turn lights, and may optionally be tapped into therebetween, and a third pipe the same but for the tail, and marker lights.

15. The lights system as in claim 12, where said light engine includes one or more of the following alone or in combination, a LED, a conventional non-dual element type bulb, a halogen bulb, a xeon bulb or other various bulb types known in the industry, whereas if an LED is used, it is preferred that a current limiting resistor be connected thereto; a light pipe.

16. The light system as in claim 12, wherein said harness includes a converging lens engaging said light engine.

\* \* \* \* \*